(12) United States Patent
Simkins

(10) Patent No.: US 11,433,534 B2
(45) Date of Patent: Sep. 6, 2022

(54) ROBOTIC ARM INCLUDING EDGE COMPUTER AND CABLING ARRANGEMENT FACILITATING FLEXIBLE FUNCTION ADVANCED DISTAL ARM END TOOLING

(71) Applicant: ABB Schweiz AG, Baden (CH)

(72) Inventor: Matt Simkins, Redwood City, CA (US)

(73) Assignee: ABB Schweiz AG, Baden (CH)

( * ) Notice: Subject to any disclaimer, the term of this patent is extended or adjusted under 35 U.S.C. 154(b) by 666 days.

(21) Appl. No.: 16/295,772

(22) Filed: Mar. 7, 2019

(65) Prior Publication Data

US 2020/0282553 A1 Sep. 10, 2020

(51) Int. Cl.
*G06F 17/00* (2019.01)
*B25J 9/12* (2006.01)
(Continued)

(52) U.S. Cl.
CPC ............ *B25J 9/126* (2013.01); *B25J 9/1664* (2013.01); *B25J 13/06* (2013.01); *B25J 15/0019* (2013.01); *B25J 17/025* (2013.01)

(58) Field of Classification Search
CPC . B25J 9/126; B25J 9/1664; B25J 13/06; B25J 15/0019; B25J 17/025; B25J 9/1602; B25J 19/0025; B25J 13/00; B25J 15/0483
(Continued)

(56) References Cited

U.S. PATENT DOCUMENTS

| | | | | |
|---|---|---|---|---|
| 4,990,022 A | * | 2/1991 | Watanabe | B25J 15/04 |
| | | | | 285/362 |
| 4,990,839 A | * | 2/1991 | Schonlau | B25J 9/08 |
| | | | | 700/248 |

(Continued)

FOREIGN PATENT DOCUMENTS

| | | | |
|---|---|---|---|
| EP | 0400624 A2 * | 12/1990 | ............ B25J 9/161 |
| EP | 0400624 B1 | 10/1994 | |

(Continued)

OTHER PUBLICATIONS

European Patent Office, International Search Report in International Patent Application No. PCT/IB2020/051763, 4 pp. (dated Jun. 9, 2020).

(Continued)

*Primary Examiner* — Ronnie M Mancho
(74) *Attorney, Agent, or Firm* — Leydig, Voit & Mayer, Ltd.

(57) ABSTRACT

A robotic arm assembly is described that incorporates a distributed control arrangement. The robotic arm assembly includes a host computer, a set of robotic arm segments, and a set of actuators, each actuator being interposed between adjacent pairs of the set of robotic arm segments to affect a relative movement between the adjacent pairs of the set of robotic arm segments. The robotic arm assembly further includes an end effector controller configured with a first interface configured to support a first communication link between the end effector controller and the host computer, (Continued)

and a second interface, separate from the first interface. The robotic arm assembly furthermore includes an end effector adapter configured to provide a high speed data interface between the end effector controller and an end effector.

14 Claims, 4 Drawing Sheets

(51) Int. Cl.
  B25J 9/16 (2006.01)
  B25J 13/06 (2006.01)
  B25J 15/00 (2006.01)
  B25J 17/02 (2006.01)

(58) Field of Classification Search
  USPC .......................................................... 700/245
  See application file for complete search history.

(56) References Cited

U.S. PATENT DOCUMENTS

| | | | |
|---|---|---|---|
| 6,014,909 A | 1/2000 | Fiora | |
| 6,389,921 B1 | 5/2002 | Nada | |
| 9,579,788 B2* | 2/2017 | Rosenberg | B25J 9/16 |
| 9,855,107 B2* | 1/2018 | Labonville | A61B 34/37 |
| 10,343,277 B2* | 7/2019 | Gombert | B25J 9/1617 |
| 10,835,345 B2* | 11/2020 | Billard | A61B 90/50 |
| 2007/0010898 A1 | 1/2007 | Hosek et al. | |
| 2007/0137372 A1* | 6/2007 | Devengenzo | A61B 34/35 74/490.01 |
| 2008/0236324 A1 | 10/2008 | Inoue et al. | |
| 2011/0071672 A1 | 3/2011 | Sanders et al. | |
| 2011/0290856 A1* | 12/2011 | Shelton, IV | B23Q 3/1554 227/180.1 |
| 2013/0125696 A1 | 5/2013 | Long | |
| 2014/0102240 A1 | 4/2014 | Inada et al. | |
| 2014/0354229 A1* | 12/2014 | Zhao | B60L 53/68 320/109 |
| 2015/0073429 A1* | 3/2015 | Sartor | A61B 17/0218 606/110 |
| 2015/0093917 A1* | 4/2015 | Stern | B25J 18/06 439/8 |
| 2016/0114491 A1* | 4/2016 | Lee | B25J 19/0029 74/490.06 |
| 2016/0235402 A1* | 8/2016 | Chowaniec | G06F 1/1637 |
| 2016/0279807 A1 | 9/2016 | Cossette et al. | |
| 2016/0327383 A1* | 11/2016 | Becker | G01B 11/005 |
| 2017/0095927 A1 | 4/2017 | Fadlovich et al. | |
| 2017/0151666 A1* | 6/2017 | Kobayashi | B25J 9/1633 |
| 2018/0021950 A1* | 1/2018 | Shimodaira | B25J 15/10 318/568.11 |
| 2018/0079090 A1* | 3/2018 | Koenig | B25J 18/04 |
| 2018/0257221 A1 | 9/2018 | Toothaker et al. | |
| 2020/0198125 A1* | 6/2020 | Muneto | B25J 9/08 |
| 2020/0269447 A1* | 8/2020 | Simkins | B25J 9/1694 |

FOREIGN PATENT DOCUMENTS

| | | |
|---|---|---|
| EP | 1932630 A1 | 6/2008 |
| EP | 1970171 A1 | 9/2008 |
| WO | WO 2004/052086 A1 | 6/2004 |
| WO | WO 2011/117944 A1 | 9/2011 |

OTHER PUBLICATIONS

European Patent Office, Written Opinion in International Patent Application No. PCT/IB2020/051763, 8 pp. (dated Jun. 9, 2020).

\* cited by examiner

ROBOTIC ARM INCLUDING EDGE COMPUTER AND CABLING ARRANGEMENT FACILITATING FLEXIBLE FUNCTION ADVANCED DISTAL ARM END TOOLING

TECHNICAL FIELD

The present disclosure relates to robotic arm systems, and more particularly, to a robotic arm including a working tool controlled, at a distal end, by a computing element. Even more particularly, the present disclosure relates to an industrial robotic arm that carries out a variety of automated tasks in an industrial/production environment. More particularly, the disclosure is directed to a robotic arm incorporating a distributed control system including multiple processors and a communications architecture facilitating highly localized control of one or more tool elements affixed to a distal segment of an industrial robotic arm.

BACKGROUND

Use of robot arm systems is becoming increasingly popular in manufacturing/industrial processes due to the ability of such systems to perform a highly repetitive operation without significant stoppage at a virtually round-the-clock basis. Manufacturing/assembly lines incorporate robotic arm-based tools to carry out a variety of tasks at potentially very high speed. Robotic arms typically include multiple connected segments that are cooperatively actuated to move a tool element to a working position with respect to a work piece.

A variety of articles of manufacture, often incorporating delicate electronic sensing and computing elements, are made using robotic arm-dominated assembly lines. Such automation is essential to meet cost and throughput requirements demanded by current electronic device market conditions. For providers of robotic arm systems used in manufacturing/industrial processes, such developments have created a need for increasingly sophisticated, highly customizable, distally mounted tool elements (referred to as "end effectors"). Such needs are not adequately met by legacy robotic arm end effectors that generally comprise vacuum cup or gripper jaw elements that are generally useful for holding/positioning relatively large and sturdy components to be assembled.

Currently, manufacturing assembly line tasks that require a particular combination of force sensing, tactile sensing, temperature sensing, 3D vision, multi-tool use, and/or multi-digit gripping, largely belong within the domain of manual labor. Reliance upon manual labor/human observation—as opposed to artificial intelligence-enhanced robotic arm technology—arises from the substantial technological challenges of providing robotic arm systems that include an end effector that is capable of performing a wide variety of specialized manufacturing tasks. Robotic arm systems designed and built according to such diverse functional requirements generally result in complex end effector apparatus sensors/tools that require one or more large bundles of cabling running along the length of the robotic arm system from a main/host computer/controller interface located in the robotic arm base (or coupled separately thereto) to the distal end of the robotic arm upon which the end effector is mounted. Such cabling presents a variety of physical/mechanical robotic arm system design challenges including: added mass, larger footprint, cable snag avoidance, contamination risk, friction-based wear and tear, electric noise susceptibility, and unreliability. The added design/build costs associated with addressing the design challenges may have the undesirable consequence of stifling design of complex end effectors and continued reliance on end effectors that perform rudimentary operations.

SUMMARY OF THE DISCLOSURE

In one aspect, the disclosure describes a robotic arm assembly. The robotic arm assembly includes a host computer, a set of robotic arm segments, including at least a most proximal robotic arm segment at a base of the robotic arm assembly and a most distal robotic arm segment, and a set of actuators. Each of the actuators is interposed between adjacent pairs of the set of robotic arm segments to affect a relative movement between the adjacent pairs of the set of robotic arm segments.

The robotic arm assembly further includes an end effector controller configured with a first interface configured to support a first communication link between the end effector controller and the host computer, and a second interface, separate from the first interface. The robotic arm assembly further includes an end effector adapter configured to provide a high speed data interface between the end effector controller and an end effector. The end effector is mounted at a distal position on the robotic arm assembly, the end effector is mounted proximate the end effector controller, and the second interface is configured to support a second communication link between the end effector controller and the end effector adapter.

In another aspect, the disclosure describes a method, carried out by the above-describes robotic arm assembly. The method includes configuring the robotic arm assembly by: configuring the host computer to provide a gross positioning of the end effector and, configuring the end effector controller to provide a real-time control over operation of the end effector. The method further comprises operating, under control of the host computer, the set of actuators to affect a gross positioning of the end effector with respect to a target. The method also includes communicating, by the host computer and the end effector controller, in association with the gross positioning of the end effector with respect to the target. The method additionally comprises controlling, by the end effector controller after achieving the gross positioning of the end effector with respect to the target, operation of the robotic arm assembly to carry out a particularized configured operation of the end effector.

Further and alternative aspects and features of the disclosed principles will be appreciated from the following detailed description and the accompanying drawings. As will be appreciated, the principles related to systems, methods, and software for apparatuses and operation thereof disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
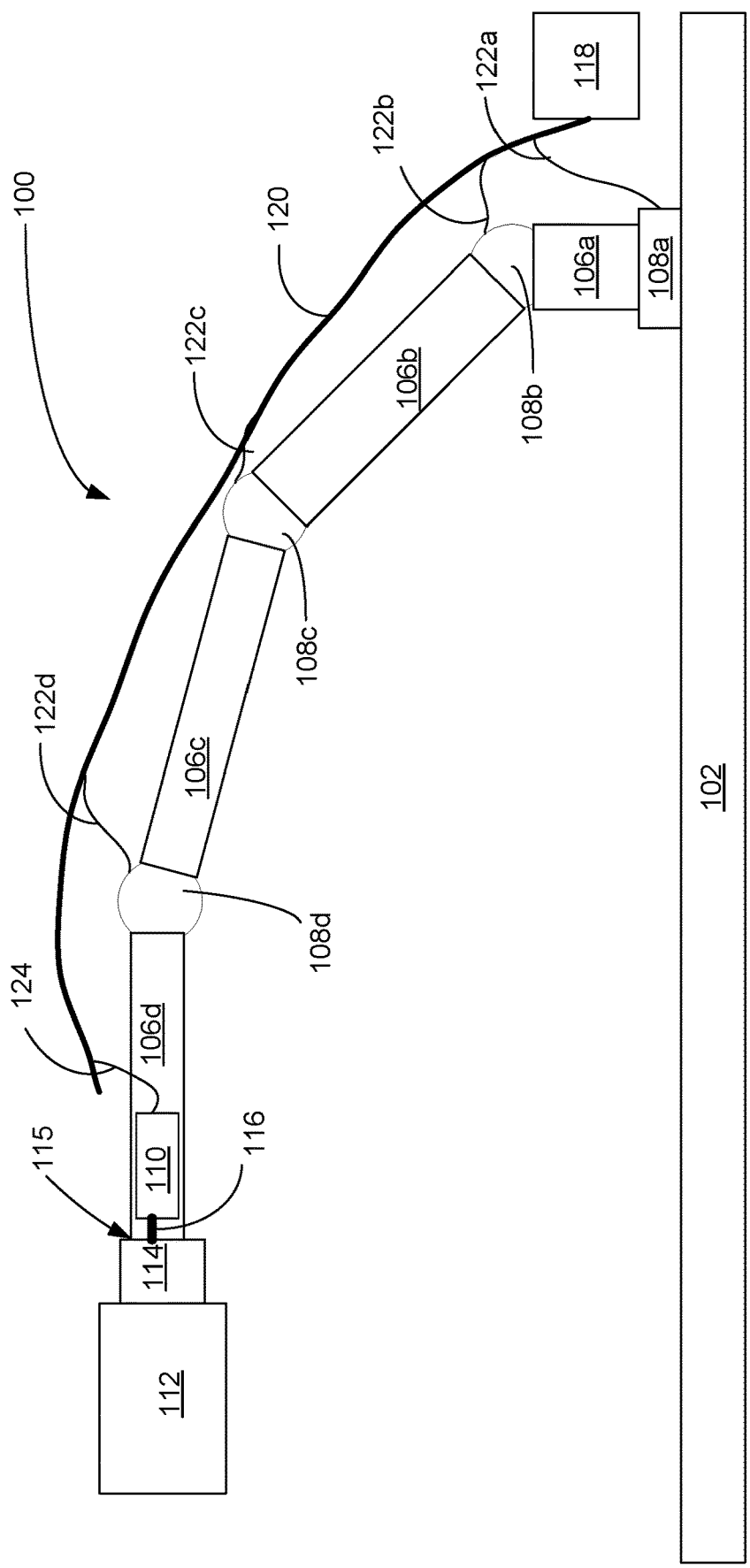
FIG. 1 is a schematic outline drawing of a robotic arm configured with a distally mounted tool element and edge computer in accordance with the disclosure.

Turning to FIG. 1, a schematic drawing is provided of an exemplary robotic arm assembly 100 according to the present disclosure. The robotic arm assembly 100 is mounted to a base 102 to ensure stability and maintain a fixed point of reference for purposes of operation of the robotic arm assembly 100. The base 102 may be stationary or moveable. The robotic arm assembly 100 includes an actuator portion comprising a base robotic arm segment 106a. By way of example, the base robotic arm segment 106a is attached to the base 102 via a rotatable mounting base arm segment actuator 108a that facilitates rotation of the robotic arm assembly 100 in relation to the base 102. Alternatively the base robotic arm segment 106a is mounted in fixed relation to the base 102.

In addition to the robotic arm segment 106a, the robotic arm assembly 100 further includes a set of robotic arm segments 106b, 106c, and 106d. It is contemplated that segments 106b, 106c and 106d may be any of a variety of segment structures. The number of segments will also vary in accordance with various contemplated implementations of the disclosed robotic arm assembly 100.

In addition to the base arm segment actuator 108a, in the illustrative example, a set of robotic arm segment actuators 108b, 108c, and 108d are provided. The structure and functional features of the robotic arm segment actuators 108b, 108c, and 108d will vary in accordance with various contemplated implementations of the disclosed robotic arm assembly 100. Moreover, the quantity of the segment actuators (108) varies based upon the number of moveable segments (106) provided in the robotic arm assembly 100. Each of the arm segment actuators 108 (with the exception of the base arm segment actuator 108a) is physically connected to/between two robotic arm segments (106). The actuator 108b is positioned between the base arm segment 106a and the robotic arm segment 106b to provide relative orientation adjustment there between. Similar connectivity is provided by actuator 108c (for segments 106b and 106c) and actuator 108d (for segments 106c and 106d).

In accordance with the disclosure, the robotic arm assembly 100 implements a distributed control, multi-processor, arrangement. In that regard, the robotic arm segment 106d, a most distal arm robotic segment from the base robotic arm segment 106a, contains/houses (or otherwise supports), among other things, an end effector controller 110. The end effector controller 110, as will be further explained below, possesses features of a standalone computer system, including: an operating system, drivers, a programming/configuration interface, network communications, loadable/configurable/executable application software, security measures, etc. The end effector controller 110, once configured/programmed, operates to communicate with and control components (e.g. sensors, tools, actuators, etc.) of an end effector 112.

An end effector adapter 114 is physically/signally interposed between the end effector controller 110 and the end effector 112. A set of wires (e.g. signal buses/lines) 116 communicatively couple the end effector adapter 114 to the end effector controller 110. The end effector adapter 114 routes the signal buses/lines of the set of wires 116 to a set of contacts (see FIG. 3) providing a signal interface for communication between the end effector 112 and the end effector controller 110. In the illustrative example, the set of contacts includes both power and communication signal— both digital and analog—interfaces. The end effector adapter 114, in accordance with the disclosure, provides a physical linkage (i.e. is structurally strong) between the distal robotic arm segment 106c and the end effector 112. In the illustrative example, the physical linkage is provided in the form of a rotatable hinging joint 115 (see FIG. 3) between the end effector 112 and the distal robotic arm segment 106c. While a single joint (rotatable hinging joint 115) is depicted in the illustrative example, in other instances no joint is present between the end effector adapter 114 and the end effector 112.

Moreover, the end effector adapter 114 provides an electrical power/signal interface between the end effector controller 110 and the end effector 112. As will be evident from the illustrative example provided in FIG. 3 (described herein below), the end effector adapter 114 may include a combination of analog signal lines and digital signal lines (e.g. address and data bus lines) that connect (via the set of wires 116) to physical analog and digital signal I/O ports of the end effector controller 110. Thus, the end effector controller 110 and end effector adapter 114 described herein, with reference to FIG. 1, support a highly configurable physical/computational platform for mounting a wide variety of end effector 112 types.

A host computer 118 is provided in accordance with the disclosure. The host computer 118 communicates with the actuators 108a, 108b, and 108c to affect a gross positioning of the end effector 112. In the illustrative example, a cable bundle 120 provides control signals, respectively via lines 122a, 122b, 122c and 122d, to the actuators 108a, 108b, 108c and 108d. Additional lines, not shown in FIG. 1, provide power to the various ones of the actuators 108a, 108b, 108c and 108d.

The robotic arm assembly 100 provides a highly configurable robotic arm application environment characterized by two distinct types communications links. A first type of communication link, a relatively large distance (several feet) communication link, exists between the host computer 118 and the end effector controller 110. A second type of communication link, having a relatively short distance (on the order of one foot or less) communication link, exists between the end effector controller 110 and the end effector 112.

Regarding the first communication link type, the host computer 118 is signally connected over a relatively longer distance via lines 124 of the cable bundle 120 to the end effector controller 110. By way of example, the lines 124 provide a communication/control link facilitating coordinating operation of the base computer 118, affecting gross positioning of the end effector 112 by the actuators 108. The end effector controller 110 subsequently affects particularized positioning/operation of tools and sensors on the end effector 112 (for example, after completing gross positioning of the end effector 112 under control of the host computer 118). While the first link type between the host computer 118 and the end effector controller 110 is depicted as a physical communication link is shown in FIG. 1, the lines 124 of cable bundle 120, which carry out communications between the controller 110 and the host computer 118, may be replaced/supplemented by a wireless (e.g. Wi-Fi, BLUETOOTH, etc.) communication link.

The communication link between the host computer 118 (lines 124) may be used to provide a remote control interface through which instructions/commands are provided to the controller 110 for processing. The instructions, which may originate from a user/application running on the host computer 118, are received by the controller 110 that may process the instructions before subsequently submitting corresponding instructions to the end effector 112. Such instructions can be any of a variety of types, including: configuring, programming, and controlling the end effector 112 in a supervisory and/or regulatory fashion. The instructions are, for example, initially received by the end effector controller 110. The end effector controller 110 thereafter converts high level instructions into particularized control signals or commands that are provided and carried out by particularized real-time communications between the controller 110 and the end effector 112 during real-time operation of the end effect 112 after carrying out the above-mentioned gross position of the end effector 112 under control of the actuators (108) by the host computer 118.

Moreover, the end effector controller 110 may be the source of gross positioning instructions to the host computer 118. In such case, the source of the instructions may be the end effector 112 or the end effector controller 110. The instructions may originate from a user and/or an application running on the end effector 112 and/or the end effector controller 110. In such case, for example, the controller 110 may send a high level instruction (position and orientation) to the host computer 118. The host computer 118, in turn, processes the high level instruction to render a transition path from the current location/orientation of the end effector to an indicated end location/orientation, and a series of actuator 108 control instructions corresponding to the transition path. Thus, the controller 110 may operate as the source of control for both the end effector 112 and (indirectly via instructions to the host computer 118) the actuators 108 of the robotic arm assembly 100.

Regarding the second communication link type, the end effector controller 110 is signally connected over a relatively shorter distance via the set of wires 116 (and the end effector adapter 114) to components of the end effector 112. By way of example, the set of wires 116 are bundled as a short cable bundle (see FIG. 3) that terminate at electrically conductive contacts on the end effector adapter 114.

During physical configuration of the robotic arm assembly 100, the end effector 112 is mounted-on/coupled-to the end effector adapter 114. The electrically conductive contacts are configured to mate with corresponding contacts of the end effector 112 after mounting/coupling of the physical interfaces of the end effector 112 and the adapter 114.

During computational/control configuration, the end effector 112 communicates via the set of wires 116 with the end effector controller 110 to form a particular functional configuration of the robotic arm assembly 100 for carrying out a particularized task facilitated by the specific physical/computational/control configuration of the end effector 112 and the end effector controller 110 combination. The controller 110 may also upload applications and/or application configuration/tuning parameters to the end effector 112 to achieve a particularized configuration of the robotic arm assembly 100.

During subsequent operation of the configured robotic arm assembly 100, the end effector 112 communicates with, and is controlled by, the end effector controller 110 via relatively higher speed and lower latency data and command communications over the close proximity communications linkage (the second link type) provided by the set of wires 116 (in contrast to the first communication link type between the host computer 118 and the controller 110). The second link type thus facilitates exercising a high degree of detailed observation and control, by the end effector controller 110, over a wide variety of automated operations carried out by the end effector 112.

The complex, configurable, functionality supported by the highly configurable high speed communication link (the second link type) between the end effector controller 110 and the end effector 112 (including the set of wires 116) facilitates eliminating a relatively longer distance physical communication link between the end effector 112 and the host computer 118 (or yet another computer positioned remotely from the end effector 112). Instead of operating the end effector 112 under control of the host computer 118, the illustratively depicted robotic arm assembly facilitates the end effector controller 110 receiving configuration/control instructions and/or data from the host computer 118 via a signal communication link of the first link type. The signal communication link requirements can be implemented using a simple physical wire configuration (e.g. a simple lightweight cable comprising a few wires). The relative simplicity (lower wire count) of the communication link between the host computer 118 and the end effector controller 110 facilitates running the cabling of the second signal communication link within the physical structures of the robotic arm.

The described arrangement, with a substantially more complex signaling architecture built into the signal communications link between the end effector controller 110 and the end effector 112, is intended to support a vast spectrum of functionality provided by the end effectors connected thereto. As such, a single generic interface supported by the first signal communication link supports a wide variety of special-purpose, interchangeable end effectors that may be attached to a mounting/signal interface provided at the distal end of the robotic arm assembly by the end effector adapter 114. Thus, a same mounting/signal interface provided by the end effector adapter 114 may support plug-and-operate configuration of the robotic arm assembly 100 with a wide variety of interchangeable end effectors 112 including one or more elements (e.g. welder, gripper, camera, screw driver, sensors, etc.) specifically configured to carry out a highly specialized robotic arm-implemented task.

Additional lines, not shown in FIG. 1, provide power to the actuators 108, the end effector controller 110 and the end effector 112 (e.g. via contacts provided on the end effector adapter 114).

The robotic arm assembly 100, illustratively depicted by way of example in FIG. 1, is particularly amenable to robotic arm assembly instances where the robotic arm segment actuators (108) are controlled in concert by the host computer 118 located (or connected to an interface) at the base 102 to perform gross coordinated movement of the robotic arm segments (106) to affect a positioning of the end effector 112. Once positioned, the relative positions of the robotic arm segments 106 are set (locked) in place, and the end effector 112 commences to operate under control of the end effector controller to carry out high precision positioning and sensing operations while performing a programmed operation on a target. Applications of the above-summarized bifurcated low-precision/high-precision robotic arm assembly control scheme include, for example, surgery (e.g. eye, brain, vascular, muscle, skeletal, etc.) and small device manufacturing/assembly (e.g. medical devices, watches, smart phones, printed/integrated circuit assembly/soldering).

In such robotic arm system applications, live operation control is divided (bifurcated) into two distinct phases. During a first phase, the host computer 118 controls actuators 108 incorporated into the robotic arm segments 106 to carry out a low-precision positioning of the end effector 112 in relation to a work piece/target. The first phase is carried out according to traditional control schemes implemented by the host computer 118 in concert with the actuators 108 incorporated into the robotic arm segments 106.

During a second phase, the end effector controller 110 interacts with functional elements (e.g. actuators and tools) incorporated into the end effector 112 to cause the end effector 112 to perform a more specialized operation or task with respect to the work piece/target. During operation of the end effector 112, the end effector 112 receives commands and data from the end effector controller 110 and provides feedback (e.g. visual, thermal, status) information to the end effector controller 110 via the relatively low latency/high bandwidth communication link including the set of wires 116 and the end effector adapter 114 connecting respective communication/control interfaces of the end effector controller 110 and the end effector 112. The second phase exhibits different requirements (from the first phase) in that the end effector controller 110 interface itself provides an automation control platform upon which any of a vast variety of specialized tools, sensors (including cameras), and/or software applications are potentially configured to operate in a precise manner under supervisory/regulatory control carried out by the end effector controller 110.

Furthermore, implementations of the robotic arm assembly 110 facilitate a secure/isolated environment for operating the end effector 112. In accordance with exemplary robotic arm assembly 100 arrangements, the end effector controller 110 operates in synchrony/coordination with, but essentially/substantially autonomously with respect to the host computer 118 (and any other controllers that operate the various actuators 108 controlling positioning of the robotic arm assembly). Host computer-based control of gross positioning/orientation of the robotic arm assembly end (carrying the end effector 112) is isolated/separated from end effector controller 110 control of the end effector 112 operation. In that regard, the host computer 118 (in coordination with potentially other controllers operating individual actuators of the robotic arm assembly segments) operates actuators in the robotic arm base and segments that affect a gross positioning and orientation of the end effector 112. Once positioned and/or oriented by the robotic arm base and segment actuators under control of the host computer 118, the end effector 112 operates under control of the end effector controller 110 operating autonomously with respect to the host computer 118. Thus, while the end effector controller 112 (and associated cabling) may be carried/mounted upon one or more segments associated with actuators 108 controlled by the host computer 118 of the robotic arm assembly 100, the end effector controller 110 does not share memory or computing/processing resources of the host computer 118—or any other controllers/computers associated with the robotic arm assembly 100.

Moreover, the end effector controller 110 carries out/supports/executes a variety of application and driver operations on a native operating system of the end effector controller. Additionally, for computer operation security and safety purposes, the end effector controller 110 incorporates appropriate cyber security measures, including appropriate firewalls and authentication/authorization operations that ensure secure operation of the end effector 112 with respect to potential unauthorized operational/command interference from other controllers associated with the robotic arm assembly 100 (e.g. one or more controllers that actuate the robotic arm segments to affect the gross positioning/orientation of the end effector). Moreover, coordinated security and safety features are implemented with regard to the controller 110 and the host computer 118 to ensure that unauthorized and/or dangerous movement of the robotic arm assembly 100 by the actuators 108 is locked out/blocked during various states of operation of the end effector 112. By way of example, the controller 110 and the host computer 118 implement a semaphore with respect to controlling the state of the actuators 108. The holder of the semaphore has the sole ability to act as the originator of an instruction bearing upon positioning the robotic arm assembly 100 using the actuators 108. Thus, after performing a gross positioning of the robotic arm assembly 100, the host computer 118 passes the semaphore to the end effector controller 110. Thus, at any given point in time, only one of either the controller 110 or host computer 118 has the ability to originate control instructions relating to the gross positioning of the end effector 112.

In illustrative examples of the robotic arm assembly, the end effector controller 110 and adapter 114 support connections by the end effector 112 to any one or more of a variety of proprietary and/or general purpose power and communication ports provided on a tool flange of a distal segment of the robotic arm assembly. The general purpose power and communication ports provide a generic platform/interface that accommodates a wide variety of communication channel types. In addition to various proprietary and simple generic (data/address bus) interfaces, the interfaces may include, for example, any of a variety of standardized/connector-based interfaces such as: Universal Serial Bus (USB), Ethernet, GPIO, analog, and RS232. Thus, the proposed arrangement supports integration of a wide range of end effector 112 types that incorporate a variety of sensor, actuator, and tool elements without the necessity of routing a significantly large number of cables from the end of the distal segment of robotic arm carrying the end effector to the robotic arm base 102 where a controller of the robotic arm end effector (e.g. host computer 118) is typically located (in known robotic arm systems).

Figure 2:
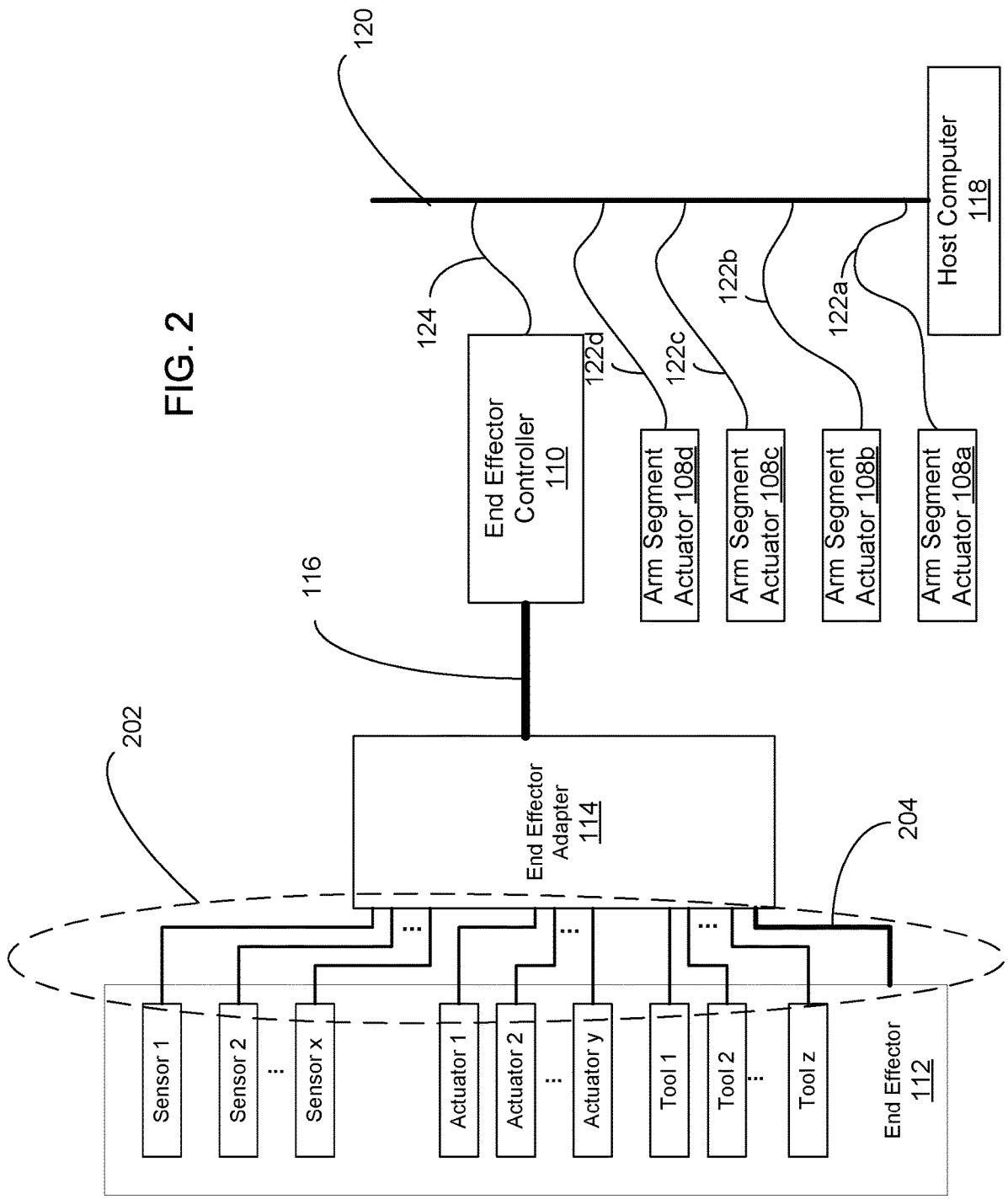
FIG. 2 is a schematic system diagram depicting a set of electronic components (computers, controllers, sensors, tools, actuators, etc.) communicatively connected in accordance with the disclosure.

Turning to FIG. 2, an exemplary schematic block diagram depicts signal paths between the various electronic components of the illustrative robotic arm assembly 100 depicted in FIG. 1. Most of the signal lines and wire bundles depicted in FIG. 2 were previously described herein above with respect to FIG. 1, and thus will not be described with reference to FIG. 2. However, FIG. 2 is notable with respect to the depiction of a set of lines 202, both power and communication signals, connecting a variety of components incorporated into and associated with the end effector 112. The set of line 202 include, for example, a power line 204 providing direct current (DC) power for the end effector 112. The remaining ones of the set of lines 202 schematically depicted in FIG. 2 include analog and/or digital (e.g. address and data bus) signal lines that communicatively connect various electronic components of the end effector 112 (e.g. sensors (1-$x$), actuators (1-$y$), and tools (1-$z$)) to the contacts provided on the end effector adapter 114. While schematically shown as single lines in FIG. 2 to avoid unduly complicating the drawing, each of the lines in FIG. 2 corresponds to a plurality of lines defining an analog or digital (data and address bus signals) signal interface between the identified components of the end effector 112 and the controller 110.

Figure 3:
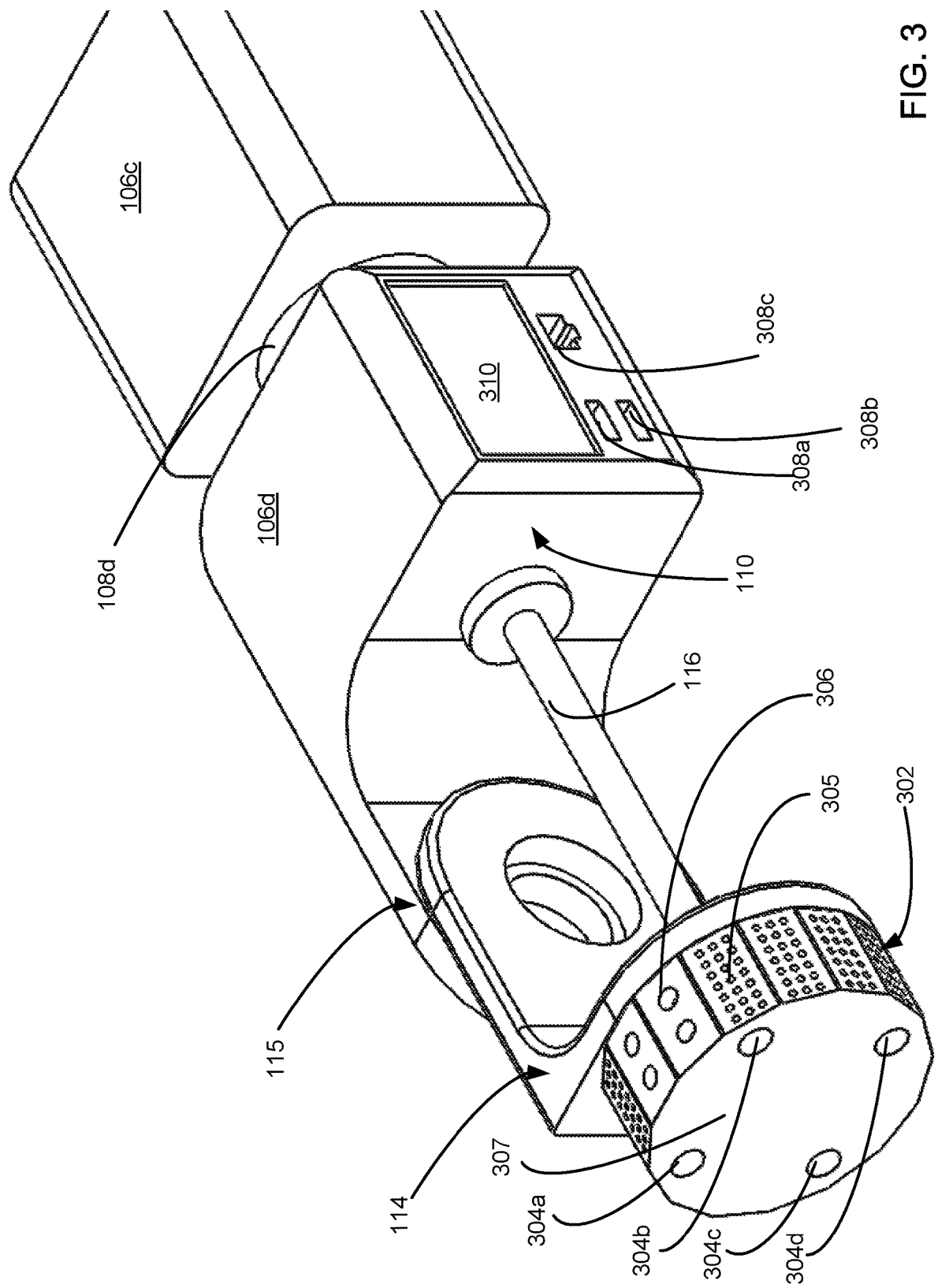
FIG. 3 is an outline view of a distal robotic arm segment that carries the end effector controller and an end effector adapter that provides a multi-function signal/wiring interface as well a mounting location for any of a variety of end effectors in accordance with the disclosure.

An example of a physical power and communication signal interface contacts of the end effector adapter 114 is described herein with reference to FIG. 3. The multiple signal line sets provided in the end effector adapter 114 interface to the end effector 112 is contrasted with the above-described relatively simple physical wiring (if at all) provided by lines 124 (of the cable bundle 120—in an illustrative embodiment) coupling the end effector controller 110 to the host computer 118.

With continued reference to FIG. 3, a perspective line drawing is provided of the robotic arm segment 106c that carries the end effector controller 110 and the end effector adapter 114 to which the end effector 112 (not shown) is physically and signally coupled at an adapter-effector interface 302 comprising a plurality of signal contacts arranged to provide a power and a communication signal (both analog and digital) interface between the wires 116 and corresponding ones of the set of lines 202 (see FIG. 2) of the end effector 112 (not shown). In the illustrative example, a face 306, of a set of substantially planar faces of the adapter-effector interface 302, provides direct current (DC) power to the end effector 112.

With continued reference to FIG. 3, a set of communication planar faces, including for example a planar face 305, are situated around the sides of the adapter-effector interface 302 in a three-dimensional space. By way of example, each one of a set of communication planar faces provides a set of analog or digital signal lines (including address lines) for a corresponding electronic component on the end effector 112. Alternatively, the set of communication planar faces of the adapter-effector interface 302 provide a shared bus interface (e.g. each face provides one or more contacts corresponding to one or more lines of a data, address, power bus used by all components of the end effector 112).

Continuing with the description of FIG. 3, in an embodiment, the planar faces of the adapter-effector interface 302 provide an asymmetric geometric face 307 (including a notch or other orienting guides) that permits engagement between the interface 302 of the adapter 114 and corresponding faces of the end effector 112 when a male portion (of the adapter 114) including the interface 302 faces and a female portion (of the end effector 112) are properly rotationally oriented with respect to one another. A set of alignment holes 304a, 304b, 304c and 304d (potentially threaded) are provided to facilitate a secure attachment of the end effector 112 to the adapter 114.

Moreover, in the illustrative example, the adapter 114 is physically coupled via the rotatable hinging joint 115 formed with the robotic arm segment 106c. The rotatable hinging joint 115 is potentially rotated by a further motor/actuator (not depicted) to provide a further control over orientation of the end effector 112 by the end effector controller 110 (or alternatively/additionally the host computer 118).

In keeping with the autonomous/independent nature of the controller 110 with respect to the host computer 118, various input/output interface elements are provided to support user control/configuration of the end effector controller 110 (and indirectly the end effector 112). A first USB port 308a, a second USB port 308b, and an ETHERNET connector provide a variety standard physical/functional communication interfaces enabling users to directly connect a variety of devices (e.g. a memory drive, a configuration device, etc.) to the controller 110.

Additionally, a touch-sensitive screen 310, supports a variety of displays for presenting data and configurable parameter values. Such values are presented, for example, via a hierarchical menu set provided by the touch-sensitive screen 310 under direction of the end effector controller 110.

In the illustrative example of the robotic arm segment 106c and the end effector adapter 114, the wires 116 are provided as a cable bundle extending from a compartment in the segment 106c containing the controller 110 to the adapter-affecter interface 302.

Figure 4:
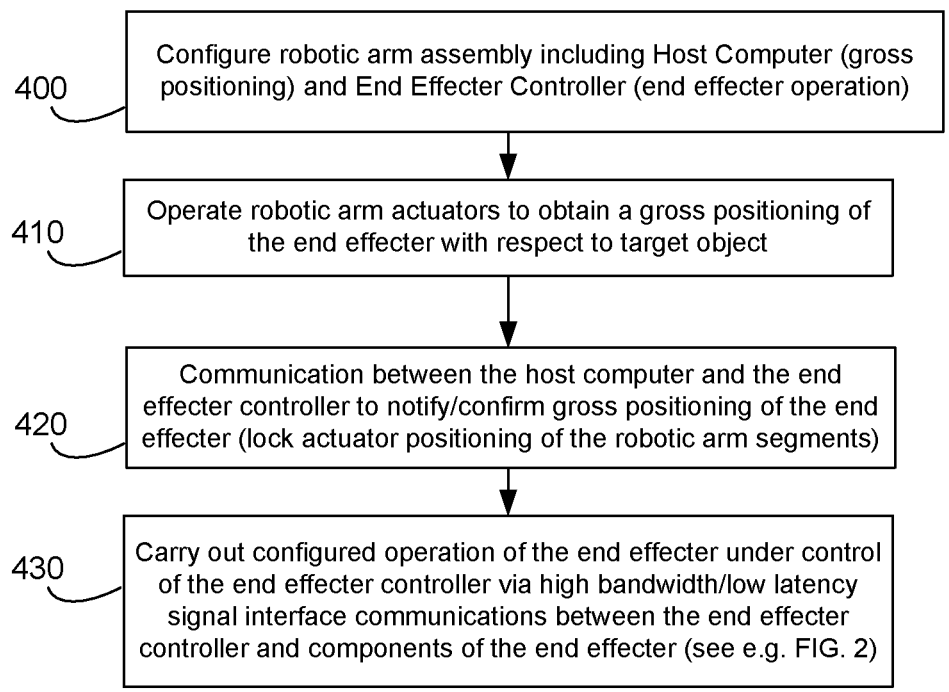
FIG. 4 is a flowchart of a method for operating the robotic arm assembly depicted in FIG. 1 in accordance with the disclosure.

Turning to FIG. 4, a flowchart summarizes steps for an exemplary method for operating the robotic arm assembly 100 in accordance with illustrative examples of the present invention. The example operation is intended to be exemplary in nature and does not exclude alternative ways of operating the robotic arm assembly depicted, by way of example, in FIGS. 1, 2 and 3. During 400, the robotic arm assembly 100 is configured by separately configuring the host computer 118 (performing gross positioning control with respect to the end effector 112) and the end effector controller 110 (performing real-time control of the end effector 112).

After configuration of the robotic arm assembly 100, during 410, the robotic arm assembly actuators 108 operate under control of the host computer 118 to affect a gross positioning of the end effector 112 with respect to a target (e.g. a patient, a work piece, etc.). During 410, the host computer 118 communicates with the actuators 108a, 108b and 108c to achieve the proper combination of orientations of the segments 106a, 106b and 106c in space to affect the desired gross positioning of the end effector 112. The host computer 118 may communicate status information, and potentially other commands causing, for example rotation of the hinging joint 115 to achieve the desired gross positioning.

Upon achieving the desired gross positioning, during 420 the host computer 118 and the end effector controller 110 communicate to notify/acknowledge achieving the desired gross positioning of the end effector 112. Control then passes to 430.

During 430, the end effector controller 110 takes over operation of the robotic arm assembly 100 to carry out a particularized configured operation of the end effector 112 that has been determined, during 420, to be properly positioned. During 430, the end effector controller 110 communicates with the end effector 112, via the set of wires 116 and the end effector adapter 114, to carry out the configured operation. As noted above, the highly parallel and short distance characteristics of the signal path between the end effector controller 110 and the end effector 112 components facilitates a high bandwidth, low latency, secure communications path for transmitting data and commands during operation of the end effector 112.

In association with operation of the end effector 112 during 430, the end effector controller 110 communicates with the host computer 118 to ensure the actuators 108 are locked in position. The locking ensures that the end effector can carry out an operation without a need to react to physical movements in space that are not directly under the control of the end effector 112 and controller 110. The locking also ensures the robotic arm assembly 100 is not re-positioned during operation of the end effector 112 (during 430) in an unexpected way that may cause the robotic arm assembly 100 to strike physical structures or human observers in the vicinity of the robotic arm assembly 100.

In the above-described example, the controller 110 operates exclusive of operation of the host computer 118 affecting gross movement of the end effector 112. However, in alternative applications/operating modes, the controller 110 and the host computer 118 coordinate simultaneous operation. For example, during a welding operation, the host computer 118 affects a continuous gross movement of the end effector 112, which includes a weld head, while the controller 110 controls both fine positioning and activation of the weld head (end effector 112) to perform the weld operation at locations in accordance with a continuous and coordinated simultaneous operation control scheme.

Various embodiments disclosed herein are to be taken in the illustrative and explanatory sense, and should in no way be construed as limiting of the present disclosure.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A robotic arm assembly comprising:
    a host computer;
    a set of robotic arm segments, including at least a most proximal robotic arm segment at a base of the robotic arm assembly and a most distal robotic arm segment;
    a set of actuators, each actuator being interposed between adjacent pairs of the set of robotic arm segments to affect a relative movement between the adjacent pairs of the set of robotic arm segments;
    an end effector controller configured with:
        a first interface configured to support a first communication link between the end effector controller and the host computer, and
        a second interface, separate from the first interface;
    an end effector adapter configured to provide a high speed data interface between the end effector controller and an end effector,
    wherein the end effector is mounted at a distal position on the robotic arm assembly,
    wherein the end effector is mounted proximate the end effector controller, and
    wherein the second interface is configured to support a second communication link between the end effector controller and the end effector adapter;
    a display interface, wherein an output of the display interface is driven under control of the end effector controller; and
    a hinging physical connection between the end effector adapter and the most distal robotic arm segment.

2. The robotic arm assembly of claim 1 wherein the second interface is coupled to the high speed data interface via a cable comprising a set of wires.

3. The robotic arm assembly of claim 1 wherein the end effector adapter includes at least a direct current power supply for the end effector.

4. The robotic arm assembly of claim 1 wherein the end effector controller comprises an operating system.

5. The robotic arm assembly of claim 1 wherein the end effector is one of a plurality of interchangeable end effectors, each of the plurality of interchangeable end effectors being configured to communicate with the end effector controller.

6. The robotic arm assembly of claim 1 wherein the end effector controller is carried by the most distal robotic arm segment.

7. The robotic arm assembly of claim 1 wherein the end effector adapter comprises a set of communication planar faces arranged in a three-dimensional space.

8. The robotic arm assembly of claim 7 wherein the set of communication planar faces are arranged on sides of an end effector adaptor connector structure, where the end effector adapter connector structure includes an asymmetric geometric face that permits engagement in only a single rotational position with a corresponding end effector connector structure of the end effector.

9. The robotic arm assembly of claim 7 wherein the end effector adapter comprises a set of alignment holes to facilitate connecting the end effector adapter and the end effector.

10. The robotic arm assembly of claim 1 wherein the end effector adapter comprises a set of communication planar faces, where one communication planar face of the set of communication planar faces provides a set of signal lines for controlling an electronic component configured on the end effector.

11. The robotic arm assembly of claim 1 wherein the end effector adapter comprises a set of communication planar faces, where multiple communication planar faces of the set of communication planar faces correspond to a data bus and an address bus of a shared bus interface between the end effector controller and multiple electronic components of the end effector.

12. A robotic arm assembly, comprising:
    a host computer;
    a set of robotic arm segments;
    a set of actuators interposed between adjacent pairs of the set of robotic arm segments to cause relative movement between the robotic arm segments;
    an end effector controller configured with:
        a first interface configured to support a first communication link between the end effector controller and the host computer, and
        a second interface, separate from the first interface;
    an end effector adapter configured to provide a high speed data interface between the end effector controller and an end effector,
    a plurality of interchangeable end effectors, one of which is mounted at a distal position on the robotic arm assembly,
    wherein the end effector is mounted proximate the end effector controller, and wherein the second interface is configured to support a second communication link between the end effector controller and the end effector adapter;

a display interface, wherein an output of the display interface is driven under control of the end effector controller; and a hinging physical connection between the end effector adapter and the most distal robotic arm segment.

13. The robotic arm assembly of claim 12, wherein each of the plurality of interchangeable end effectors is releasably connected to the end effector adapter and configured to communicate with the end effector controller.

14. The robotic arm of claim method of claim 13, wherein, during operation, the end effector controller communicates with the host computer to affect a coordinated simultaneous operation of the set of actuators and the end effector in accordance with a continuous and coordinated simultaneous operation control scheme.

* * * * *